United States Patent [19]

Berkman

[11] 4,440,458
[45] Apr. 3, 1984

[54] HOLDER FOR VIDEO GAME AND COMPUTER CARTRIDGES, VIDEO FILM CARTRIDGES, AUDIO/VIDEO CASSETTES AND THEIR STORAGE CASES

[75] Inventor: Joseph L. Berkman, Mamaroneck, N.Y.

[73] Assignee: Berkman Industries, Inc., Boynton Beach, Fla.

[21] Appl. No.: 348,149

[22] Filed: Feb. 11, 1982

[51] Int. Cl.³ .............................................. A47B 81/06
[52] U.S. Cl. ........................................ 312/9; 206/387; 312/10; 312/330 R
[58] Field of Search ................ 206/387; 312/8, 9, 10, 312/11, 12, 205, 183; 248/DIG. 12

[56] References Cited

U.S. PATENT DOCUMENTS

| 1,030,534 | 6/1912 | Pooler | 312/10 |
| 3,904,158 | 9/1975 | Michael | 248/432 |
| 4,117,931 | 10/1978 | Berkman | 211/40 |
| 4,132,311 | 1/1979 | Gilnert | 206/387 |
| 4,239,306 | 9/1983 | Klaus | 312/12 |
| 4,266,834 | 5/1981 | Ackeret | 312/111 |
| 4,303,159 | 12/1981 | Stone et al. | 206/387 |

FOREIGN PATENT DOCUMENTS

7709480 3/1979 Netherlands .................. 206/387

Primary Examiner—James T. McCall
Assistant Examiner—Joseph Falk
Attorney, Agent, or Firm—Lackenbach, Siegel, Marzullo, Presta & Aronson

[57] ABSTRACT

This invention relates generally to storage devices, and more particularly to a holder having a plurality of tandem storage compartments or bins each of which can securely hold and store many differently-sized audio/video cassettes, TV game and computer cartridges, and video film cartridges, as well as their enclosures, sleeves or storage cases.

24 Claims, 26 Drawing Figures

| 60 | 60 |
|---|---|
| 12' | 12' |
| 12' | 12' |
| 12' | 12' |
| 12' | 12' |
| 12' | 12' |
| 12' | 12' |
| 12' | 12' |
| 12' | 12' |

| 60 | |
|---|---|
| 12 | 76 |
| 12 | 76 |
| 12 | 76 |
| 12 | 76 |
| 12 | 76 |
| 12 | 76 |
| 12 | 76 |
| 12 | 76 |

HOLDER FOR VIDEO GAME AND COMPUTER CARTRIDGES, VIDEO FILM CARTRIDGES, AUDIO/VIDEO CASSETTES AND THEIR STORAGE CASES

BACKGROUND OF THE INVENTION

This application is related to my copending U.S. patent application, Ser. No. 332,974, filed Dec. 21, 1981.

Numerous storage devices are known, such as U.S. Pat. Nos. 3,889,817, 4,003,468 which disclose cases or devices having compartments or bins, each of which are adapted to interchangeably receive and store either a standard 8-track magnetic audio cartridge or a magnetic audio cassette enclosure. Other U.S. patents, such as Nos. 3,907,116 and 3,736,036 employ separately styled compartments or shelves for storing boxed audio cassettes in one of the styled shelves or compartments and unboxed audio cassettes in the other styled shelves or compartments.

Yet another storage unit (U.S. Pat. No. Des. 257,496) known as the X-14 manufactured by the Service Manufacturing Co., Inc.) receives and stores in different positions of a single compartment one or the other of the conventional and widely marketed recorder formats known as the Beta and the VHS configuration of video cassettes. Beta being Sony's entry into the video cassette market and Zenith Corporation and Sears & Company also market Beta video cassettes. The VHS configuration is slightly wider and is a longer video cassette than the Beta configuration. It is marketed under the Panasonic mark by the Matsushita Electric Industrial Co., Ltd. of Osaka, Japan, and the RCA Company markets video cassettes under this configuration. Beta and VHS being the only known formats currently employed for use in video cassette recorders sold to the public.

Another prior art storage device also manufactured by Service Manufacturing Co., Inc. marketed under VC-14/15 and VC-28/30 are respectively capable of receiving and storing in different compartments 14 VHS or 15 Beta cassettes, and 28 VHS or 30 Beta cassettes. This device, however, employs removable elements for setting up alternate compartments which are transversely disposed relative to a first set of compartments for one of the video cassettes.

Still another storage device marketed under the trademark "Cassette 'n Game" file by Innovative Concepts, Inc. of San Jose, Calif. 95131, employs one style compartment for holding and storing boxed audio cassettes and a differently-styled compartment for holding and storing any one of a number of video game cartridges, such as an Atari game cartridge or an Intellevision game cartridge, etc.

However, none of the known tape storage devices, whether they are of the type for audio enclosures or of the type for video enclosures, are capable of receiving and storing in a single compartment or bin one video cassette with or without its protective cardboard sleeve, two boxed audio cassettes, two T.V. game cartridges, two computer game cartridges or two video film cartridges. As all of the known storage devices are limited in receiving only one or two of the aforementioned magnetic tape enclosures, it has been necessary for an audio/video fan in the past to acquire a plurality of different storage devices to hold and store the many different types of magnetic tape enclosures available in today's audio video industry. Such a requirement results in unnecessary inconvenience and expense and also requires considerable space in one's apartment or room to place the many different types of storage cases one would need to hold and store a large and varied collection of magnetic tape enclosures, including but not limited to the following: boxed audio cassette enclosures, video tape cassettes of the Beta and VHS configurations with or without their protective cardboard sleeves or jackets, video film cartridges for video cameras, with or without their protective sleeve or jacket, video game cartridges, such as Atari, Intellevision, Bally, and Activision, and video computer game cartridges, such as the Odyssey TV computer game by Magnavox, the Space Invaders TV computer game by Atari, Inc. (a Warner Communication Company), and the Command module home computer cartridge game (blackjack and poker) by Texas Instruments.

Accordingly, it is a principal object of the present invention to provide an improved storage device for holding and storing substantially any type of audio/video magnetic tape enclosure including ($\frac{1}{4}''$) video film cartridges for use in video cameras and for T.V. game and computer cartridges.

Another object of the invention in its broadest application is to provide a storage device which in a single compartment or bin is capable of receiving and storing either one video cassette with or without its boxed sleeve, or two ($\frac{1}{4}''$) video film cartridges with or without their sleeves, or two T.V. game or computer cartridges of the same or different configurations.

Yet a further object of the invenion is to provide a storage case or holder which is relatively simple in construction and one which is capable of economical manufacture.

It is yet still a further object of the invention to provide a holder or storage device which includes a plurality of storage compartments or bins each of which can securely hold one boxed video cassette with or without its cardboard sleeve enclosure or storage case, or two boxed audio cassettes or two T.V. game or computer cartridges, or two video film cartridges.

The storage unit or holder in accordance with the present invention comprises a tray having at least one bin, and preferably a plurality of bins for audio/video cassettes, video film cases or cartridges, and video game or computer cartridges, and wherein the bins are capable of interchangeably receiving and storing differently-sized video cassettes and differently sized video game or computer cartridges, as well as ($\frac{1}{4}''$) video film cartridges. Each bin is of generally rectangular configuration and is generally bounded by a bottom wall (14), side walls (22, 24) and end walls (18, 20). Another bottom wall (30) above said bottom wall (14) and on both sides of each bin transversely extends substantially for the width of said bin, and terminates generally at second end walls (34) extending upwardly from said another bottom wall (30). Additional side walls (40) extending on one side from said bottom wall (14) to said another bottom wall (30) and on the other side from said another bottom wall (30) to a further bottom wall (31); and additional end walls (36) extending from said further bottom wall (31) to additional bottom walls (50); and pairs of channel-shaped side walls (42, 46 and 48) extend downwardly from said further bottom wall (31) and terminating at said bottom wall (14) between said additional end walls (38); wherein each said bin can hold one video cassette of either Beta or VHS configuration, or a Beta or VHS cassette in a cardboard sleeve, or two different video game or computer cartridges, or two (¼") video film cartridges or two boxed audio cassettes or any combinations thereof, except for the larger video cassettes which a ban can only hold one of either the Beta or VHS.

The present invention thus will be better understood and the main objects and important features, other than those specifically enumerated above will become apparent when consideration is given to the following details and description, which when taken in conjunction with the annexed drawings, describes, discloses, illustrates and shows the preferred embodiments or modifications of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

DESCRIPTION OF THE PREFERRED EMBODIMENT

Figures 1, 2:
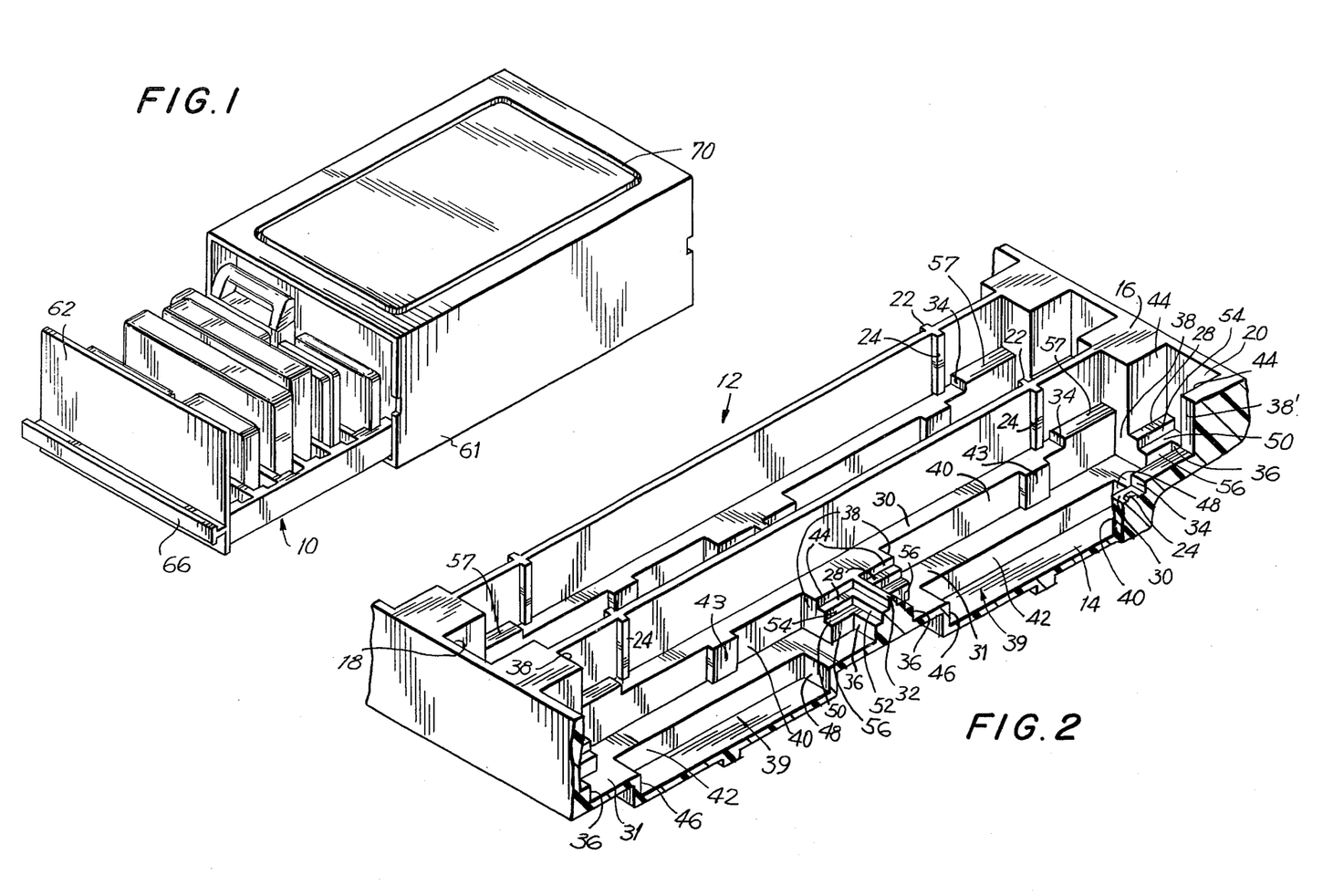
FIG. 1 is a perspective view of a holder or storage device for audio/video cassettes, video film cartridges, T.V. game or computer cartridges as well as their enclosures or storage cases, the holder or device being in the form of a drawer for a cabinet or case, and showing holding therein twelve different items in identically styled compartments or bins, such as audio/video cassettes and video film cartridges as well as T.V. game or computer cartridges and their enclosures or storage cases.
FIG. 2 is a fragmentary, perspective view of a typical compartment or bin, and showing in greater detail the various shelf and/or wall means for receving and storing differently-sized audio/video cassettes, T.V. game and computer cartridges and their enclosures or storage cases, as well as (¼") video tape cartridges, or their sleeves used for video cameras.
Figure 3:
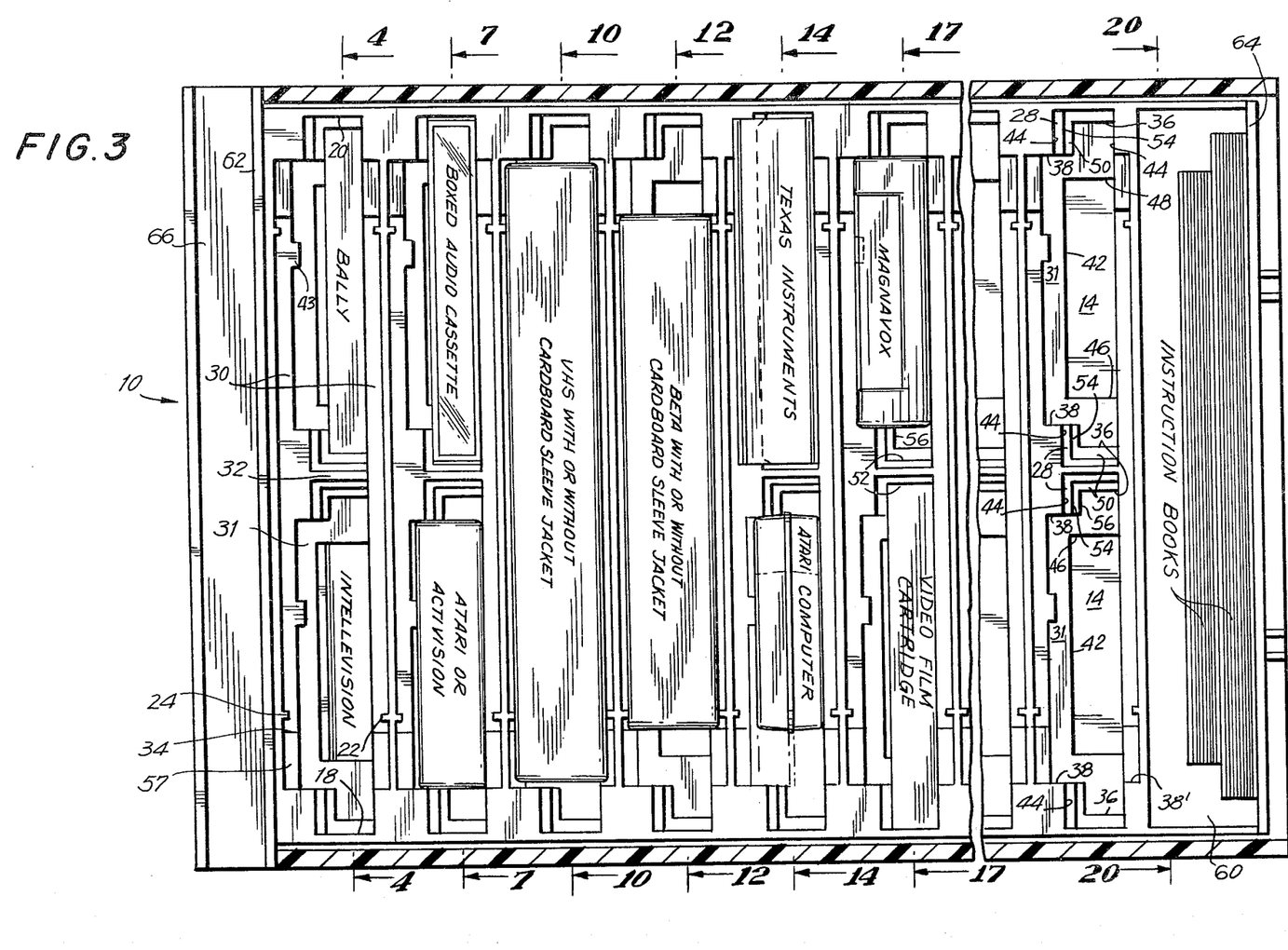
FIG. 3 is a plan view partly broken away, of the drawer shown in FIG. 1, and illustrating twelve items therein including a video film cartridge, audio/video cassettes, magnetic T.V. game or computer cartridges and their enclosures or storage cases.
Figure 4:
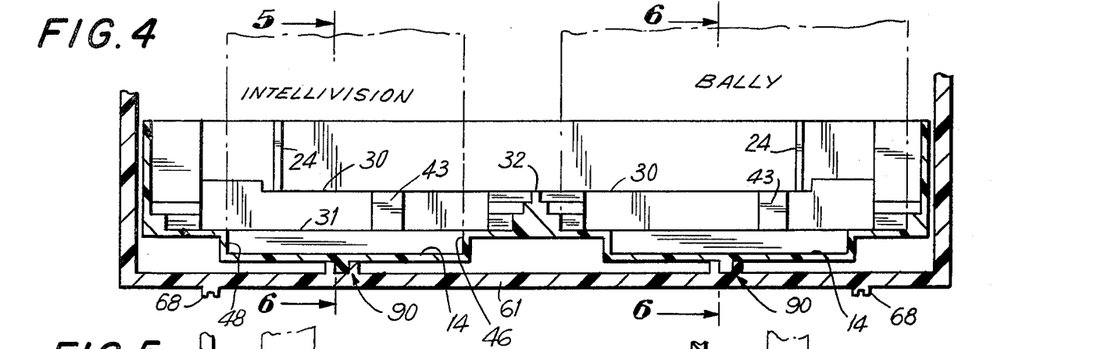
FIG. 4 is a cross-sectional view, generally taken along the line 4—4 of FIG. 3.
Figure 5:
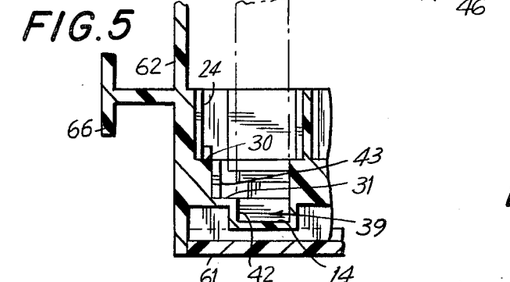
FIG. 5 is a cross-sectional view, generally taken along the line 5—5 of FIG. 4.
Figure 6:
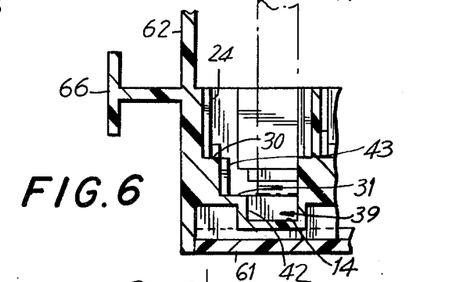
FIG. 6 is a cross-sectional view, generally taken along the line 6—6 of FIG. 3.
Figure 7:
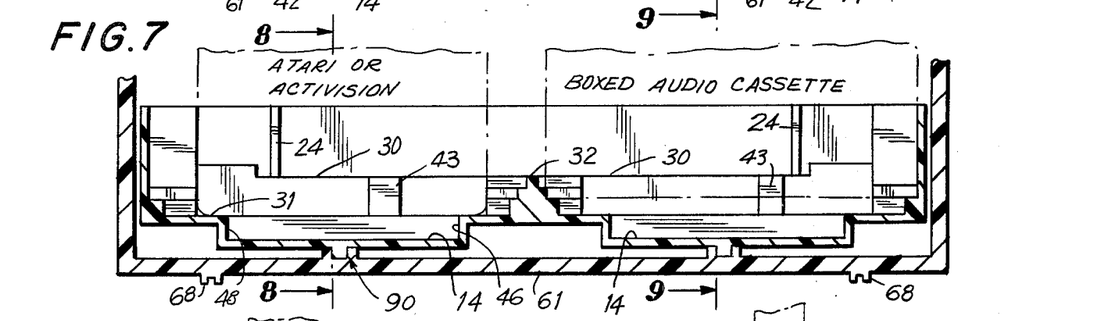
FIG. 7 is a cross-sectional view, generally taken along the line 7—7 of FIG. 3.
Figure 8:
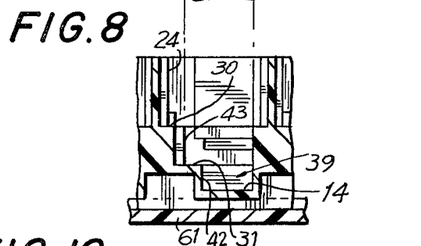
FIG. 8 is a cross-sectional view, generally taken along the line 8—8 of FIG. 7.
Figure 9:
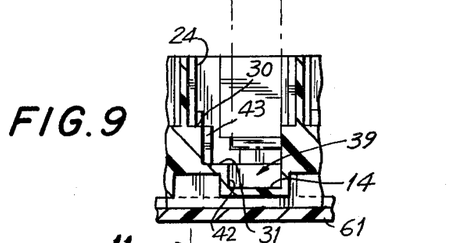
FIG. 9 is a cross-sectional view, generally taken along the line 9—9 of FIG. 7.
Figure 10:
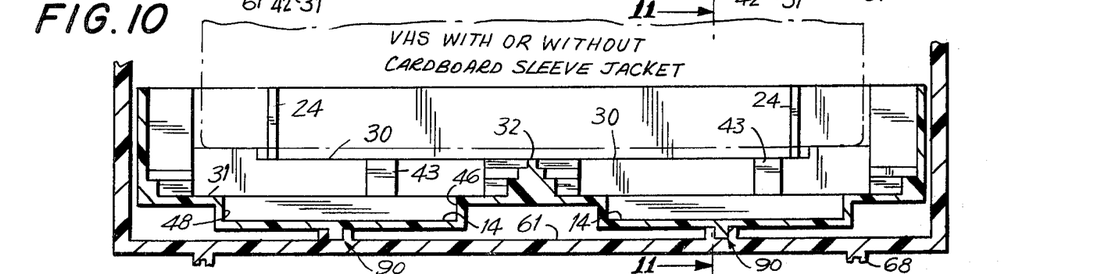
FIG. 10 is a cross-sectional view, generally taken along the line 10—10 of FIG. 3.
Figures 11, 12:
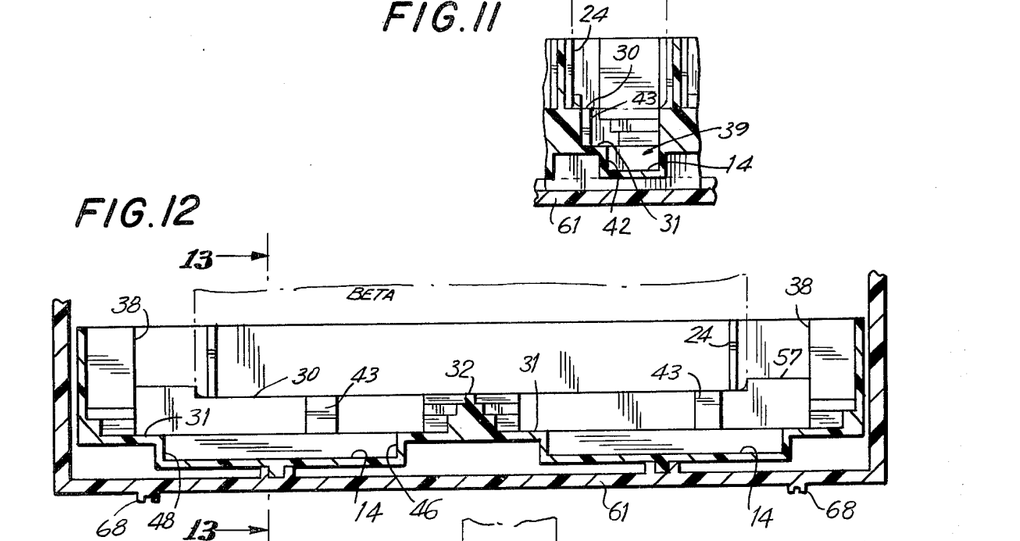
FIG. 11 is a cross-sectional view, generally taken along the line 11—11 of FIG. 10.
FIG. 12 is a cross-sectional view, generally taken along the line 12—12 of FIG. 3.
Figures 13, 14:
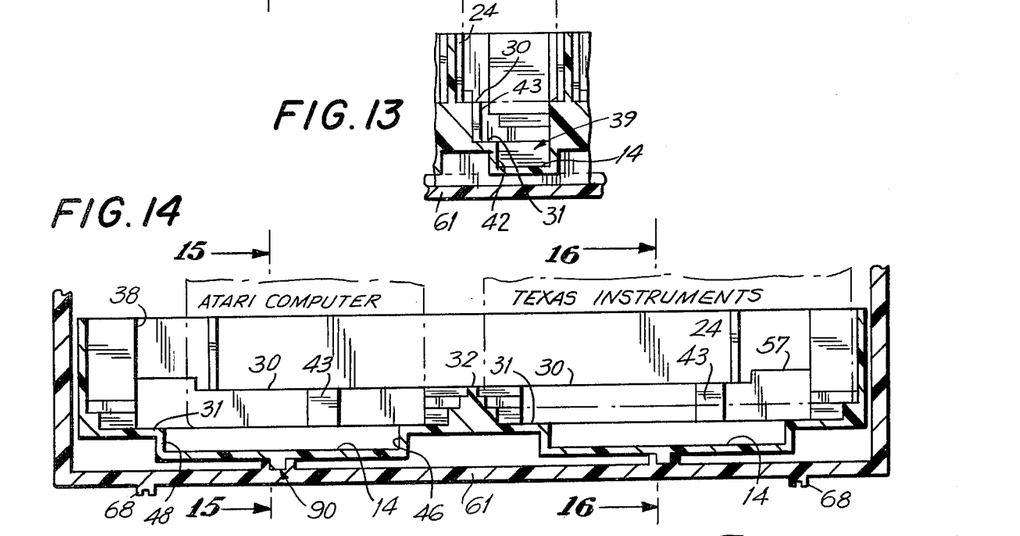
FIG. 13 is a cross-sectional view, generally taken along the line 13—13 of FIG. 12.
FIG. 14 is a cross-sectional view, generally taken along the line 14—14 of FIG. 3.
Figure 15:
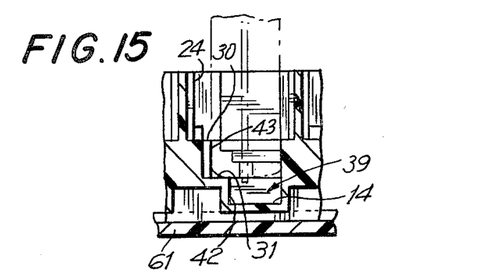
FIG. 15 is a cross-sectional view, generally taken along the line 15—15 of FIG. 14.
Figure 16:
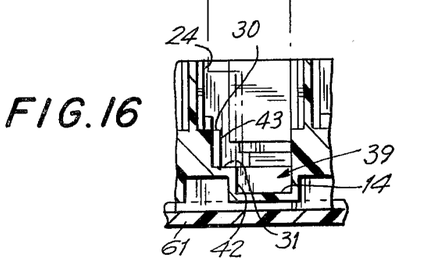
FIG. 16 is a cross-sectional view, generally taken along the line 16—16 of FIG. 14.

Referring now to the drawings, and in particular to FIGS. 1-3, in which identical or similar parts are designated by the same reference numerals throughout, the holder or storage device is in the form of a drawer in accordance with the present invention and is generally designated by the reference number 10.

The drawer 10 has or is provided with at least one compartment or bin 12, and preferably ten identical tandem or adjacent bins, and each bin generally has a bottom wall 14, a top wall 16 and end walls (or wall surfaces) 18 and 20. Side or front and rear walls 22 and 24 generally form the remaining walls which provide the overall rectangular structure to each bin form. Walls or wall surfaces 22, 24 may, if desired, be formed as a "thick" wall separating the bins. Such wall surfaces or walls 22,24 greatly facilitate removal of a Beta or VHS cartridge where they are stored next to each other in a plurality of adjacent bins.

Each compartment or bin 12 is also provided with a second bottom surface wall 28 comprising spaced apart walls and a third bottom wall surface 30 comprising spaced apart walls and a central divider wall 32 generally separating the bin 12 into a pair of "half" compartments or bins disposed in end-to-end fashion for about the full transverse width of the bins 12 with each said "half" compartments or bins holding a boxed audio cassette enclosure, a (¼") video film cartridge, or a T.V. game or computer cartridge. Fourth bottom surface walls 31 are also provided between the bottom wall 14 and the second bottom surface walls 28.

Each compartment or bin 12 is further provided with second end surface walls 34 comprising spaced apart walls, third end surface walls 36 comprising spaced apart walls, and fourth end walls 38 and 38' comprising spaced apart walls.

The central divider wall 32 in a sense splits each compartment or bin 12 into identical right and left halves as noted hereinabove; and each compartment or bin 12 is also provided with intermediate or additional side walls, such as the pair of side walls 40, side wall surfaces 42, and the side walls 44. End walls (38,38') act as end stops for a VHS video cassette.

Extending up from the bottom wall 14 are a plurality of walls comprising preferably a pair of end wall surfaces 46 and 48, and the intermediate side wall surface 42 which extends between end wall surfaces 46 and 48, and these three walls together define a recess or well space along with the bottom wall 14 and one of the intermediate side surface walls 40 for receiving and holding an Intellivision video game cartridge, such as those made and sold by Mattel, Inc. of Los Angeles, Calif., as is best shown in FIG. 3. Of course, although two recesses or wells 39 are shown, one may be employed in either half bin.

Figure 17:
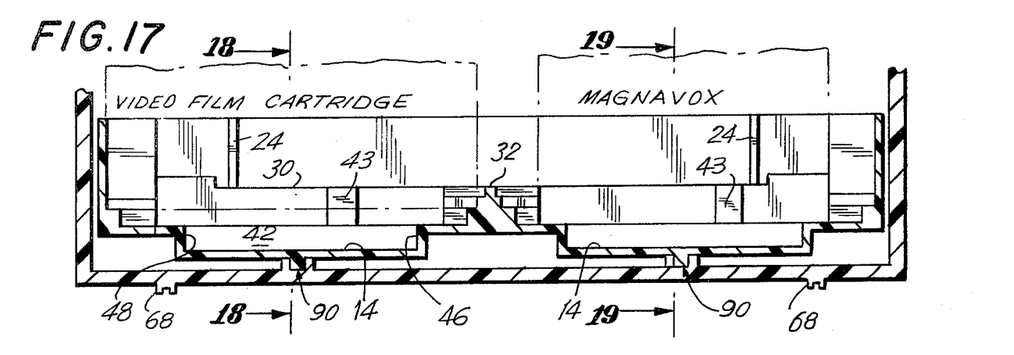
FIG. 17 is a cross-sectional view, generally taken along the line 17—17 of FIG. 3.
Figure 18:
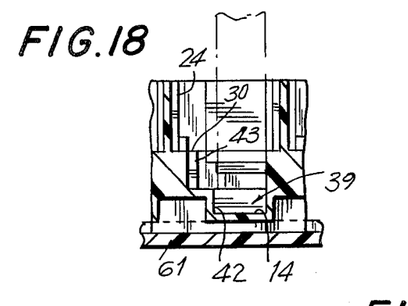
FIG. 18 is a cross-sectional view, generally taken along the line 18—18 of FIG. 17.
Figure 19:
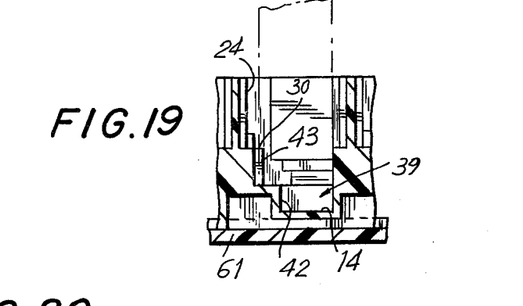
FIG. 19 is a cross-sectional view, generally taken along the line 19—19 of FIG. 17.
Figure 20:
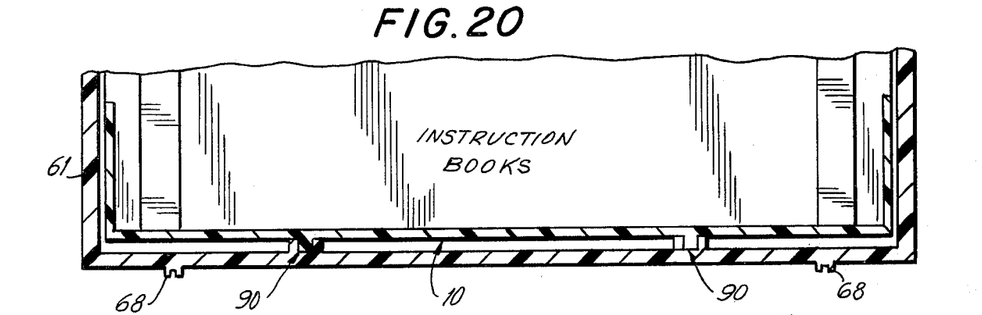
FIG. 20 is a cross-sectional view, generally taken along the line 20—20 of FIG. 3.
Figure 21:
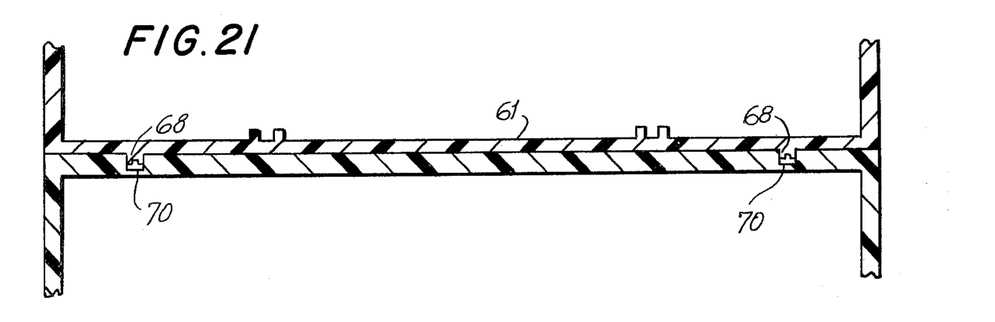
FIG. 21 is a fragmentary sectional view, showing the stacking feature of the storage devices of the present invention.

The fourth bottom wall surfaces 31 and an intermediate side wall surface 40 and a side wall 43 (formed as a projection), as well as the end walls 38, together define a space for receiving and storing or holding a Magnavox video game cartridge, as is also shown in FIGS. 3, 17 and 19. The various audio/video cassettes, video film cartridge, game or computer cartridges and their enclosures or storage cases are received and stored or held in each compartment or bin by means of the following recited wall surfaces or walls and/or guides. These surfaces define the boundaries by which each magnetic tape enclosure (which incidentally are all generally rectangular in shape) is securely retained in place in the drawer or holding device of the present invention.

For a magnetic tape audio cassette enclosure or boxed audio cassette, the wall boundaries forming its own "compartment or bin" within the bin 12 comprise a second bottom wall 28, end wall 20, the central divider wall 32, and the intermediate side walls 44.

For the video game cartridges, such as Atari, and Activision, the wall boundaries forming its own "compartment bin" within the bin 12 comprise a fourth bottom wall 31, the intermediate side walls 38 and the side walls 40.

For the Mattel's "Intellevision" video game cartridge, the wall boundaries forming its own "compartment or bin" within the bin 12 comprise the bottom wall 14, intermediate side walls 40 and 42, and end walls 46 and 48.

For the Beta video cassette (preferably with its protective cardboard sleeve jacket for a more snug fit) the wall boundaries forming its own "compartment or bin" within bin 12 comprise third bottom walls 30, front and rear or side walls 22, 24 and second end walls 34 which act as end limit stops for the Beta video cassette.

For the VHS video cassette (with or without its protective cardboard sleeve jacket), the wall boundaries forming its own "compartment or bin" within the bin 12 comprise sixth bottom walls 57, end walls 38, 38' and the front and rear or side walls 22, 24.

For the (¼") video film cartridge or its storage case or sleeve for video cameras, the wall boundaries forming its own "compartment or bin" within the bin 12 comprise a fifth bottom wall 50, end walls 18, 20, end wall 52, side wall 54 and the side wall 40.

For the Atari computer game cartridge, the wall boundaries forming its own "compartment or bin" within the bin 12 comprises a fourth bottom wall 31, the side walls 40 and 43, and the end walls 38 which act as end limit stops for this cartridge which can be inserted flush along one end wall 38 or the other end wall 38, as is best shown in phantom in FIG. 3 of the drawing.

For the Magnavox "Odyssey 2" T.V. computer game cartridge, the wall boundaries forming its own "compartment or bin" within the bin 12 comprises a fourth bottom wall 31, end walls 38, and the side walls 40. The wall 43 formed by the projection extending out from side wall 40 provides a mating guide for a cooperative "alignment" groove provided on this type of computer game cartridge.

For the Texas Instrument'home computer "Command Module" cartridge, the wall boundaries forming its own "compartment or bin" within the bin 12 comprises a second bottom wall 28, end walls 20, divider wall 32, and side walls 44.

For the Bally video game cartridge, the wall boundaries forming its own "compartment or bin" within the bin 12 comprise a fourth bottom wall 31, side wall 40, side walls 56 (which are parallel to side wall 40), and end walls 36. Of course, it is possible to seat a Bally cartridge or for that matter just about any cartridge with a single end wall 36 on one side of the "half-bin" which would be sufficient to retain the cartridge in place transversely, but which would permit some "end play".

Thus, all of the twelve different configurations can be received and securely stored in place in any one compartment or bin 12 of the drawer or holder of the presennt invention, with each compartment or bin 12 capable of storing two of the same or different video game or computer cartridges or boxed audio cassettes or video film cartridges; or one video cartridge of either the Beta or VHS type with or without its cardboard sleeve.

The drawer or storage container structure is also, if desired, suitably provided with another singular compartment or bin 60 for storing instruction booklets, such as those normally associated with the various video game cartridges. This bin 60 may be conveniently placed at either end of the drawer 10, and is optional.

It should also be recognized that the drawer may comprise one or more compartments or bins, and it can be suitably molded from a plastic material. In the preferred example of the invention, the storage device is in the form of a drawer which is mated with and cooperatively associates with a case 61. The drawer is thus covered and protected from dust when closed. Suitable front and rear panels 62 and 64 are secured to the drawer or tray for completely enclosing the drawer or tray when it is mated with its case. Of course, the drawer may also be suitably equipped with a handle 66 to facilitate pulling and pushing of the drawer 10 in and out of the case. Alternatively, the rear of the case 61 may be closed, eliminating the need for a rear panel 64 at the back of the drawer.

The single row drawer 10 of the invention thus is capable of holding ten video tape cassettes, of either Beta or VHS configurations (or a mixed group), with or without cardboard sleeve jackets; or 20 boxed audio cassettes; or 20 video film cartridges; 20 of any of the aforementioned video game or computer cartridges or cassettes or any combination of the above.

Figure 23:
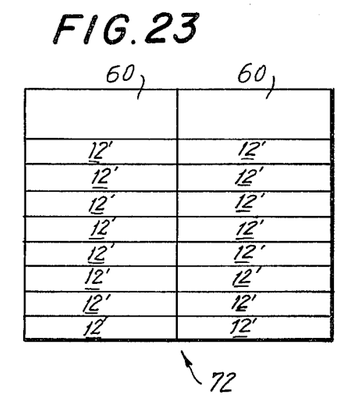
FIG. 23 is a diagramatic representation of a drawer or holding device embodying two rows of compartments or bins.
Figure 24:
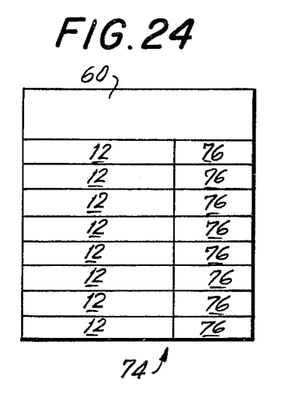
FIG. 24 is another diagramatic representation of a drawer or holding device embodying one row of compartments or bins of a full size and one row of compartments or bins of a half size construction for just the boxed audio cassettes, (¼") video film cartridges or T.V. game and computer cartridges.

FIG. 23 illustrates diagramatically an integral two drawer 72 with bins 12' just like the bins 12 of the embodiment of FIGS. 1–21. In a similar view, FIG. 24 shows a hybrid drawer 74 having bins 12 of FIGS. 1–21 and "half-bin" (76) as if bin 12 was cut in half along the centerline of divider wall 32. Thus, this drawer 74 can hold all that the drawer of FIGS. 1–21 can hold, plus ten additional video game or computer cartridges or ten additional boxed audio cassettes or ten video film cartridges or any combination thereof.

Figure 25:
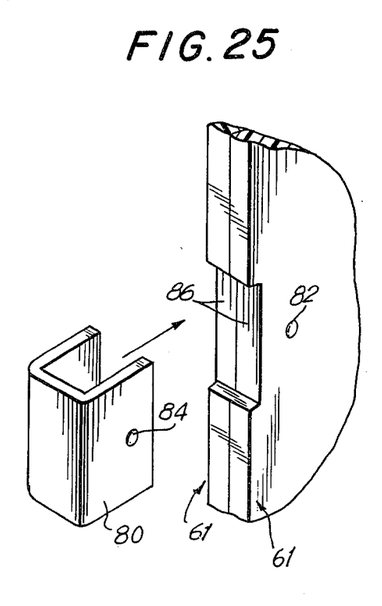
FIG. 25 is a fragmentary view of adjacent side panels of side-by-side covers or cases for a pair of drawers held together by front and rear clip-like elements so as to in effect provide a two-row drawer.
Figure 26:
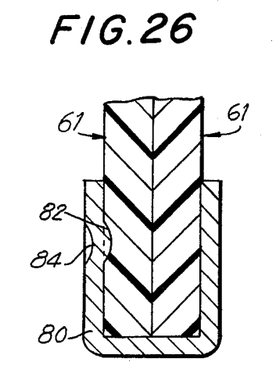
FIG. 26 is a cross-sectional view through the clip-like element and side panels shown in FIG. 21.

In FIGS. 25 and 26, a two row storage unit is shown, but not integrally made. As shown therein, the vertical side walls of a pair of cases 61 are held together by clip-like elements 80 at the front and rear ends (only one shown). Similarly, the clips may be applied at the bottoms of the vertical side walls. In such cases, suitable access means must be provided, such as with a slotted "clearance" holes. The clip-like elements 80 and the vertical side walls are provided with mutually cooperative detent means, such as, for example, tit 82 and a depression 84 for locking the two cases together. Other well-known and conventional means may be employed to hold the cases together as a unit. The cases 61 may be suitably notched as at 86, and along the sides or bottoms of side walls, if necessary (not shown) to provide whatever clearance is required for the drawers 10 to move completely into and out of the case 61 without any interference whatsoever. If desired, guide rails on the inside side walls (not shown) of the case 61 may be employed to aid in "tracking" the drawer in and out of the cases.

It should also be noted that below sixth bottom walls 57 reside all of the of the other bottom walls (bottom walls 14, second bottom walls 28, third bottom walls 30, fourth bottom walls 31 and fifth bottom walls 50) so that such other walls do not interfere with the Beta and VHS video cassettes. Even the side walls 44 are out of the way of the video cassettes since they are beyond the end walls 38, 38' and adjacent the end walls 18 or 20. In addition, the drawer 10 is also suitably guided within the case 61 by means of mating tongue and groove tracks 90.

The case may also be preferably equipped with a suitable tongue 68 and groove 70 for nesting with other like cases one atop the other to facilitate stacking and storage of a multiplicity of storage cases of the invention, the tongue 68 being at the base of the case 61 and the mating groove at the top of the case 61.

Figure 22:
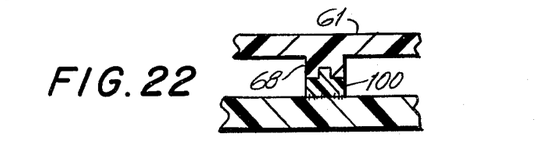
FIG. 22 is a cross-sectional view through a resilient "foot" or pad which may be employed on the base of the storage devices without interfering with the stacking feature.

If desired, an optional resilient "foot" or pad 100 may be employed as the tongue 68 or part of same for providing some cushioning effect and to preclude the storage case from sliding along the substrate upon which it is placed.

In summary, each bin of the holder of the invention can interchangeably receive and hold either an unboxed Beta cassette, cardboard boxed Beta, an unboxed VHS cassette, cardboard boxed VHS; or any combination of two boxed audio cassettes or video film cartridges; Atari, Magnavox, Texas Instruments, Bally, Intellivision or Activision T.V. game or computer cartridges.

In addition, although the scale is reduced in the drawings, the various sizes of the units or cases, cassettes and cartridges are relatively in proportion to that of the case.

It is to be understood that the description of the various game/computer cartridges by referring to the names of the manufacturers does not limit the application solely to the cartridges made by that manufacturer.

It is expected that other manufacturers will produce game/computer cartridges for use in the various systems currently on the market. For example, the Activision cartridge is designed for use in the Atari system.

I claim:

1. A storage unit or holder having at least one bin for video cassettes and video game/computer cartridges, wherein the bin is capable of interchangeable receiving and storing a plurality of differently sized video cassettes, video film cartridges and differently sized video game/computer cartridges each said bin comprising a generally rectangular configuration bounded by a bottom wall (14), side wall surfaces (22,24), and end walls (18, 20), another bottom wall surface (30) projecting from and being disposed above said bottom wall (14) and on both sides of each bin transversely extending substantially for the width of said bin, and terminating generally at second end surface walls (34) extending upwardly from said another bottom wall surface (30); additional side surface walls (40), projecting from said side wall surfaces (22,24), and extending on one side from said bottom wall (14) to said another bottom wall surface (30) and on the other side from said another bottom wall surface (30), to a further bottom wall surface (31) projecting from and being disposed above said bottom wall (14) and residing between the bottom wall (14) and said another bottom wall surface (30); additional end surface walls (36) projecting from said end wall (18,20) and extending from said further bottom wall surface (31) to additional bottom surface walls (50); and at least one channel-shaped side wall surfaces (42, 46, 48) extending upwardly from said bottom wall (14) to said further bottom wall surface (31); other bottom surface walls (28) projecting from said bottom wall surface (31) and being disposed between said additional bottom surface walls (50) and short bottom surface walls (57) above said another bottom wall surface (30); and secondary side surface walls and secondary end surface walls; wherein each bin can securely hold in place between cooperatively associated walls one video cassette of either Beta or VHS configuration, or two video film or game/computer cartridges of either the same or different configurations.

2. The storage unit or holder according to claim 1, including a central divider wall (32) perpendicular to a side surface wall (40) which projects from a said side wall surface, and forming two half bins within a bin for securely holding and storing in place two boxed audio cassettes on said other bottom surface walls (28) between said end walls and said central divider wall and between a secondary side surface wall and one of said additional side surface walls (40).

3. The storage unit or holder according to claim 1, wherein some of said video game cartridges and said computer cartridges are securely retained in place between said additional side surface walls (40) and other end walls (38).

4. The storage unit or holder according to claim 1, wherein the other of said video game cartridges are securely retained in place between a said channel shaped side wall surface, (42, 46, 48) and one of said additional side surface walls (40).

5. The storage unit or holder according to claim 2, wherein said secondary side surface walls comprise first, second, third and fourth side surface walls parallel to each other, and wherein the first side surface walls (56) restrict the transverse movement of a Bally video game cartridge.

6. The storage unit or holder according to claim 5, wherein the second side surface walls (54) restrict the transverse movement of a video film cartridge and secondary end surface walls (52) adjacent the central divider wall (32) as well as the end walls (18,20) restrict the endwise movement thereof.

7. The storage unit or holder according to claim 5, wherein the third side surface walls (44) restrict the transverse movement of a boxed video cassette.

8. The storage unit or holder according to claim 5, wherein the fourth side surface walls (43) restrict the transverse movement of at least one of the computer cartridges.

9. The storage unit or holder according to claim 5, wherein the second side surface walls (54) restrict the transverse movement of at least one of the computer cartridges.

10. The storage unit or holder according to claim 2, wherein the additional side surface walls (40) restrict the transverse movement of at least one of the computer cartridges.

11. The storage unit or holder according to claim 3, wherein said other end surface walls (38, 38') restrict the endwise movement in said bin of a VHS video cassette, and said side wall surfaces (22, 24) restrict the transverse movement thereof.

12. The storage unit or holder according to claim 1, wherein said second end wall surfaces (34) restrict the endwise movement in said bin of a Beta video cartridge and said side walls (22, 24) restrict the transverse movement thereof.

13. The storage unit or holder according to claim 2, including two secondary end walls (52) between additional bottom surface walls (50) and said other bottom surface walls (28), and wherein said two half bins interchangeably receive either said boxed audio cassettes, said video film cartridge or said video game/computer cartridges.

14. The storage unit or holder according to claim 1, wherein the additional end surface walls (36) restrict the endwise movement of a Bally video game cartridge.

15. The storage unit or holder according to claim 1, including a case for said storage unit or holder.

16. The storage unit or holder according to claim 15, wherein said holder comprises at least one drawer provided with at least a front panel and said front panel having handle means.

17. The storage unit or holder according to claim 15, wherein said case is provided with matching torgue and grooves on its bottom and top surfaces, so that a plurality of dust cases can be stacked in a nested condition on atop another.

18. The storage unit or holder according to claim 16, wherein said storage unit or holder comprises two rows, each row having ten bins.

19. The storage unit or holder according to claim 18, wherein said rows are in a side by side fashion with said bins transversely disposed with respect to said case.

20. The storage unit or holder according to claim 19, wherein said rows are provided in said drawer.

21. The storage unit or holder according to claim 20, wherein said rows and said drawer are integral.

22. The storage unit or holder according to claim 20, wherein two cases in the form of tubular sleeves are employed and said cases are secured in a side by side fashion by means of chip-like elements for holding said cases together as an assembly with two drawers and each drawer having one row of bins.

23. The storage unit or holder according to claim 1, wherein said holder is provided with a plurality of bins.

24. The storage unit or holder according to claim 23, wherein one of said plurality of bins is a storage bin bounded by a bottom, end and side walls so as to be capable of holding instruction books for the video game and computer cartridges.

* * * * *